US005099222A

United States Patent [19]

Campagna

[11] Patent Number: 5,099,222
[45] Date of Patent: Mar. 24, 1992

[54] VOLUME INCREASING FLASHER UNIT FOR TURN SIGNAL SYSTEM

[75] Inventor: Gerald L. Campagna, San Jose, Calif.

[73] Assignee: Fact Games, Ltd., San Jose, Calif.

[21] Appl. No.: 572,049

[22] Filed: Aug. 23, 1990

[51] Int. Cl.⁵ ............................................. G09G 3/22
[52] U.S. Cl. .................................. 340/475; 340/474; 340/457
[58] Field of Search ............... 340/457, 475, 476, 474, 340/477, 326, 328, 329, 384 E, 460

[56] References Cited

U.S. PATENT DOCUMENTS

| | | | |
|---|---|---|---|
| 2,835,879 | 5/1958 | du Rocher | 340/474 |
| 3,445,810 | 5/1969 | Donohoo | 340/457 |
| 3,689,832 | 9/1972 | Leto | 340/384 E |
| 4,933,665 | 6/1990 | Bull | 340/457 |

Primary Examiner—Jin F. Ng
Assistant Examiner—C. Oda
Attorney, Agent, or Firm—Phillips, Moore, Lempio & Finley

[57] ABSTRACT

A flasher unit is provided which can plug into the standard flasher receptacle of a turn signal system of a vehicle. When the vehicle operator selects a turn signal lamp by operation of the turn signal switch, the flasher unit will cycle the chosen lamp on and off at a predetermined rate for as long as the turn signal switch is closed. The flasher unit will also operate an audible signal to indicate that the turn signal system is in operation, with the level of the audible signal progressively increasing in the event that the operator forgets to restore the turn signal switch to the off position.

9 Claims, 2 Drawing Sheets

VOLUME INCREASING FLASHER UNIT FOR TURN SIGNAL SYSTEM

BACKGROUND OF THE INVENTION

This invention relates to turn signal systems for vehicle and more particularly to an improved flasher unit for such systems.

A typical turn signal system for a vehicle includes a switch (usually actuated by a wand on the steering column) which is moved by the driver from a neutral position to one position wherein the right turn signal lamps are operated or a second position wherein the left turn signal lamps an operated. The system also includes a flasher unit that operates to turn the selected signal lamps on and off at a repetition rate within the range specified by the vehicle code. The flasher unit is located in the driver's compartment and emits an audible signal, usually a clicking sound in each cycle of operation, to help advise the driver that the turn signal system in operation.

Flasher units do wear out or otherwise become inoperative and accordingly the turn signal systems are designed with a standard two terminal receptacle into which the flasher unit is plugged. Thus, if a flasher unit fails, it is removed and a replacement flasher unit is plugged back in.

The turn signal system is turned off in two ways First, if the steering wheel has been rotated a sufficient amount when making a turn, a return of the steering wheel will automatically move the wand and turn signal switch back to their neutral positions. Secondly, the wand may be moved back to its neutral position by the driver.

Very often, and particularly when driving on highways or freeways, the driver may turn on the turn signal system when changing lanes. The amount of steering wheel movement in a lane change is usually very little, and the turn signals system will not be automatically restored when the lane change has been completed. With traffic noise, or with a sound system turned up high, the low level clicking sound of the flasher unit may not be heard. If distracted, the driver may forget to move the wand back to neutral position. As a consequence, the turn signal system will continue in operation, indicating to others that the driver may be going to make a turn or change lanes again. Reliance by other drivers on the unintended operation of the turn signal system can create hazardous situations.

It is an object of the present invention to provide a flasher unit which provides a more perceptible warning to the driver if the turn signal system has been left on for an extended time.

It is a further object of the invention to provide such a flasher unit as can be plugged into a standard flasher receptacle, with no other connection to the electrical system of the vehicle.

SUMMARY OF INVENTION

The present invention is directed towards meeting the above objects.

In the main aspect of the present invention, a flasher unit is provided having means to cyclically operate the chosen signal lamp on and off for as long as the turn signal switch is on, means to generate audible signals during operation of the signal lamps, and means for progressively increasing the volume level of the audible signal during the time that the turn signal switch remains closed.

A more specific aspect of the invention is the provision of a flasher unit which can plug into the conventional two terminal flasher plug receptacle of a turn signal system, the flasher unit having switching means for connecting the terminals directly together, a diode and capacator connected in series across the terminals, a signal generating means for generating an audible signal, a control circuit connected across the capacitor and powered by the capacitor voltage, the control circuit having means to cycle the switching means on and off at a predetermined rate, means to cyclically connect the signal generating means to the capacitor voltage, and means for progressively increasing the power applied to the signal generating means.

Other aspects and advantages of the invention will become apparent in the course of the following detailed description.

BRIEF DESCRIPTION OF THE DRAWINGS

In the drawings, forming a part of this application.

DESCRIPTION OF THE PREFERRED EMBODIMENT

Figure 1:
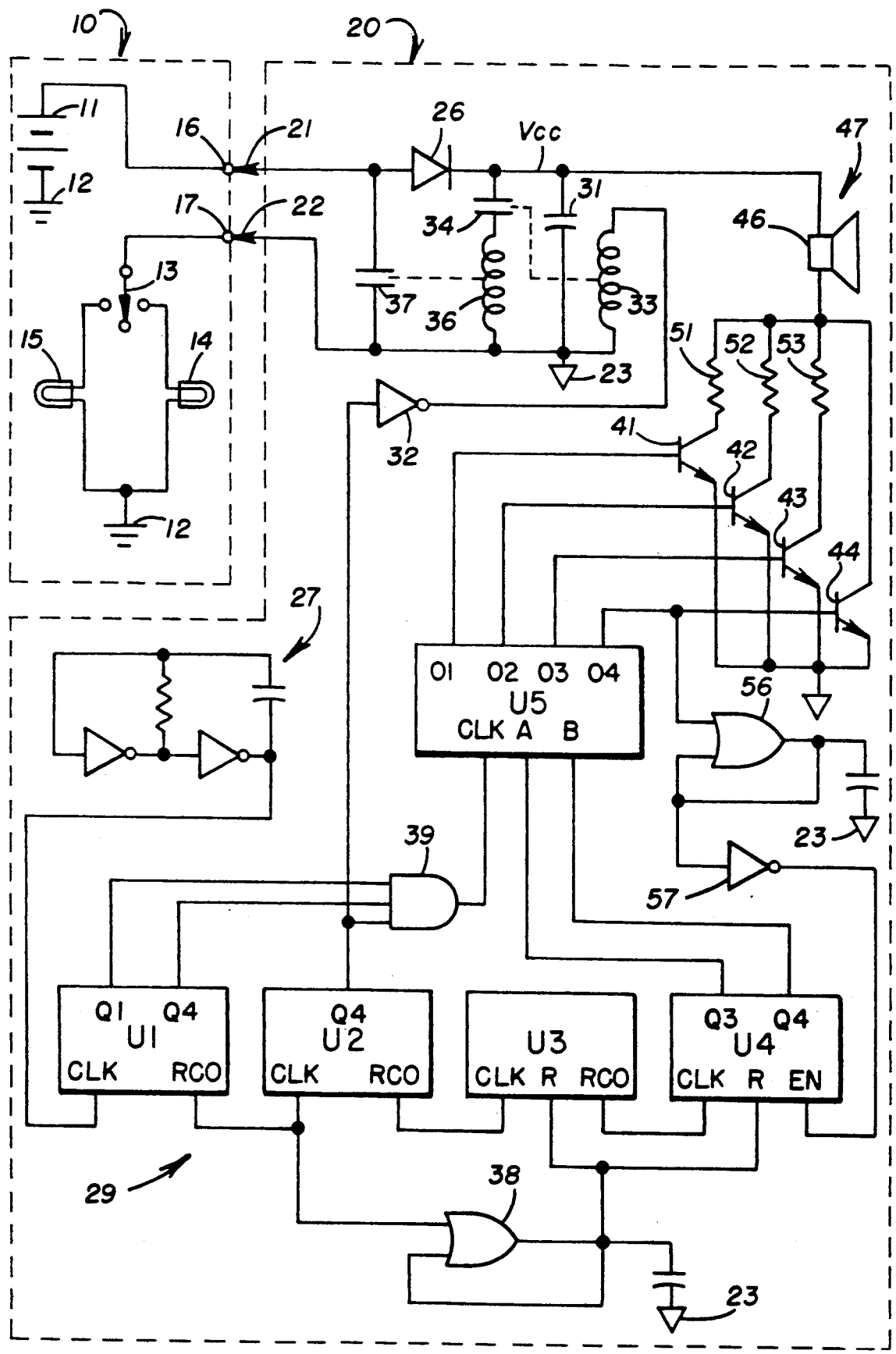
FIG. 1 is a schematic drawing of the turn signal system of a vehicle and a flasher unit in accordance with the present invention used therewith.

In the drawings, wherein a preferred embodiment of the present invention is disclosed, the reference number 10 indicates a typical turn signal system for a vehicle, such system having a battery 11, connected to the chassis ground 12 of the vehicle and a turn signal switch 13 which enables the driver selectively to actuate the right turn signal lamps 14 or the left turn signal lamp 15. Such a system will include terminals 16 and 17 of a standard flasher receptacle into which a conventional flasher unit (not shown), may be connected. Such units typically include a bi-metallic strip through which battery current can flow, with the strip bending away from a contact when heated by the current and returning to the contact when cooled, so that the selected signal lamp will flash on and off at a desired rate. Such flasher unit will also generate relatively low intensity sounds for each cycle of flashing, to indicate to the driver that a signal lamp is flashing.

The flasher unit 20 of the present invention has two connectors 21 and 22 adapted to plug into the terminals 16 and 17 of a standard flasher receptacle. No other electrical connection is made between the flasher unit 20 of the present invention and the electrical circuits of the vehicle. The ground plane 23 of the flasher unit 20 is connectable to the chassis ground 12 of the vehicle only through one or the other of the signal lamps 14 or 15. The operating voltage, Vcc, of the flasher unit 20 is obtained from the positive side of battery 11 through diode 26. The control circuit for the flasher unit 20 includes a clock 27 which generates square-wave clock pulses at a rate of 300 Hz to clock the counter means 29 made up of four binary counters U1, U2, U3 and U4 daisy chained together.

In operation of the flasher unit 20, operation of the turn signal switch 13 will connect the ground 23 of the flasher unit through one of the relatively low resistance (typically 3 ohms) lamps 14 or 15. With this connection, battery current can now flow through diode 26 to charge the high capacitance capacitor 31. The inherent time required for the integrated circuits of the flasher unit 20 to come up will enable the capacitor 31 to become almost fully charged in the initial operation of the flasher unit 20.

In due course, inverter 32 will have a high output so that low power relay coil 33 is energized to close its contacts 34. This in turn energizes the high power relay coil 36 to close its contacts 37 so that the battery current is now applied through switch 13 to the chosen signal lamp. Diode 26 will prevent capacitor 31 from discharging through the now closed relay contacts 37, and this capacitor will maintain the voltage Vcc high enough to power the control circuits of the flasher unit 20 while the relay contacts 37 are closed.

The clock pulses from clock 27 are applied at a 300 Hz rate to the clock input of binary counter U1. Carry pulses will be delivered from the carry output RCO of U1 to the clock input of counter U2 at a rate of 18.75 Hz, and the Q4 output of counter U2 will cycle at a rate of about 1.17 Hz. Therefore, after about 0.4 seconds, the Q4 output of counter U2 will go high, the output of inverter 32 will go low, and the relay coils 33 and 36 will be deenergized. Contacts 37 open to disconnect the battery 11 from the chosen indicator lamp 14 or 15. Capacitor 31 will now recharge. The U1 and U2 counters will continue to count, and in approximately another 0.4 seconds, the Q4 output of counter U2 will go low. The Q4 output of counter U2 will thus serve to cyclically operate the relay contacts 37 between closed and open positions so that the chosen indicator lamps will flash on and off at a rate of about 1.17 Hz, for as long as the turn signal switch 13 is closed.

The ripple carry pulse from counter U1 is applied to one of the inputs of OR gate 38, causing its output to go high (and remain latched high since its output is connected to one of its inputs). The high output of this gate resets both counters U3 and U4.

Figure 2:
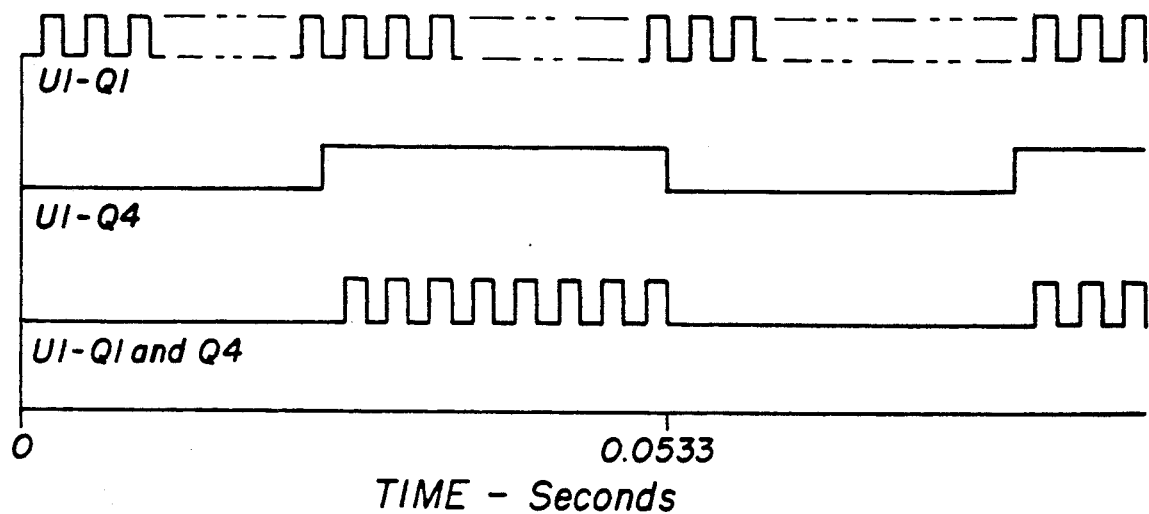
FIGS. 2 and 3 show waveforms at various points in the control circuit of the flasher unit of FIG. 1.
Figure 3:
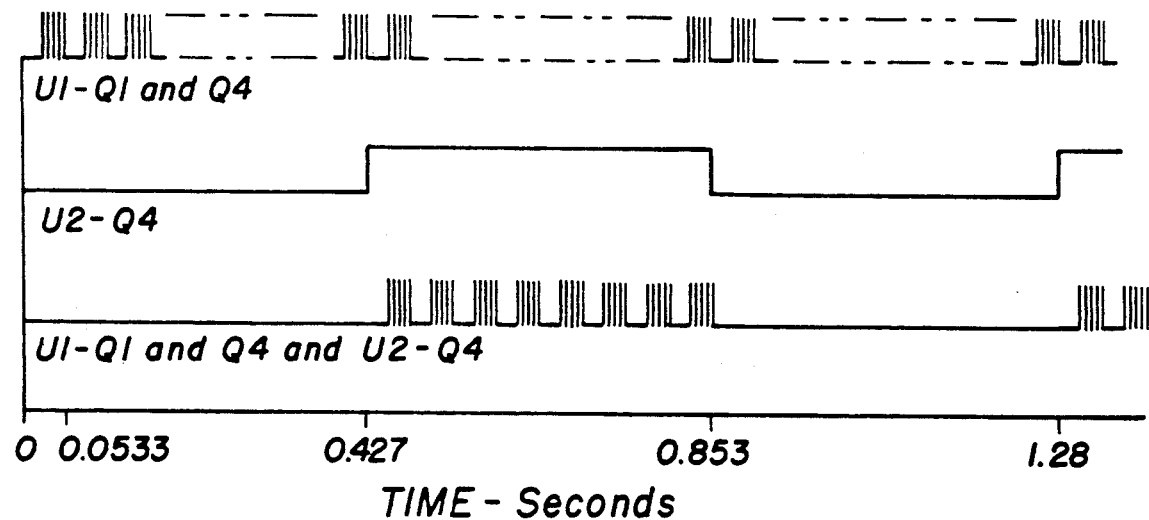

The Q1 and Q4 outputs of counter U1 and the Q4 output of counter U2 are connected to the AND gate 39. As shown in FIGS. 2 and 3, the Q1 and Q4 outputs of counter U1 have frequencies of 150 and 18.75 Hz respectively, while the Q4 output of counter U2 has a frequency of 1.171875 Hz. When all of these outputs are combined, the output of AND gate 39 will be a series of eight bursts of 150-Hz pulses during the approximately 0.4 seconds that the chosen signal lamp is on. The pulses are applied to the clock input of the 1-of-4 decoder U5. A 1-of-4 decoder functions so that, when the decoder is clocked, one only of the four outputs 01, 02, 03, 04 will be high, depending on the state of the A and B inputs. For example, when both A and B inputs are low, output 01 is enabled and will go high when the decoder is clocked. The A input is connected to the Q3 output of counter U4 and will have half a cycle of operation of approximately one minute, while the B input will go from low to high, or vice versa, in approximately 2 minutes.

The decoder outputs are connected to transistors 41, 42, 43 and 44 to progressively connect the coil 46 of speaker 47 through resistors 51, 52 and 53, or directly, to circuit ground, resistors 51, 52 and 53 having decreasing values of resistance. For example, if the resistance of the speaker coil 47 is 8 ohms, the resistance of resistors 51, 52 and 53 should preferably be about 10, 8 and 3 ohms, respectively.

During the initial operation of the flasher circuit 20, the bursts of 150-Hz pulses applied to the clock input of decoder U5 will turn transistor 41 on and off at a 150 Hz rate, and the speaker will produce a relatively low level 150 Hz audible signal while the chosen signal lamp is on. The 150 Hz sound of the speaker is relatively low in frequency and generally simulates the clicking sound of a conventional flasher unit.

If the turn signal switch 13 is left closed, after about a minute the 02 output of the decoder U5 will be enabled so that the transistor 42 will be switched on and off at the clock input rate. Since resistor 42 is of lesser resistance, the level of the audible signal from speaker 47 will increase. After about another minute, the 03 output will be enabled and the output level from the speaker will again increase. If the turn signal switch 13 is still not opened, after about another minute the 04 output of the decoder U5 will be enabled and the speaker coil 46 will be connected through transister 44 directly to ground to produce the maximum output level of the speaker. The 04 output of the decoder is connected to OR gate 56 so that as soon as the 04 output goes high the output of OR gate 56 will go high (and will latch high because the output is connected to one of the inputs of the OR gate). This will cause the output of inverter 57 to go low. This grounds the enable input of counter U4 so that it will cease to count, leaving both Q3 and Q4 outputs of decoder U5 enabled. Speaker 47 will then continue at its maximum volume until turn signal switch 13 is opened.

As mentioned previously, when relay contacts 37 are closed, capacitor 31 will maintain the Vcc voltage of the flasher unit 20 sufficiently high for operation of the flasher unit 20 during the approximately 0.4 seconds that the lamp is on. During the succeeding 0.4 seconds, when contacts 37 are open, capacitor 31 will recharge.

At any time after the turn signal switch 13 has been closed to initiate operation of the flasher unit 20, the operator may open the switch. Such opening will immediately stop the lamps from flashing. Such opening will also disconnect the ground 23 of the flasher unit 20 from the chassis ground 12 so that capacitor 31 cannot now be recharged from battery 11. The value of capacitor 31 is selected so that the voltage Vcc will decay to an inoperable level in about twice the normal 0.4 seconds on-time of an indicator lamp. Thus, when switch 13 is opened, the speaker 47 will normally not sound more than once. If the capacitor 31 is charged sufficiently so that there is still enough operating voltage to energize the speaker coil for a second time, the sound level will be very low and will decrease rapidly because of the drain of the speaker coil and of the relay coils 37 and 36 from the unrecharged capacitor 31.

Merely for purposes of disclosure, an operating embodiment of the flasher unit has been made with 4161 integrated circuits for the four-bit binary counters U1, U2, U3 and U4, a 4555 integrated circuit for the 1-of-4 decoder U5, and a 10,000 microfarad capacitor 31.

In the flasher unit 20 shown and described herein, the relay contracts 37 function as a switching means to connect terminals 16 and 17 together or to disconnect them from each other. Other devices may be used, if desired to perform this switching function. For example, a silicon controlled rectifier (SCR) may be used and controlled in response to the cycling Q4 output of counter U2.

The foregoing description of a preferred embodiment of the invention has been presented for purpose of illustration and description. It is not intended to be exhaustive or to limit the invention to the precise form disclosed. Obviously many modifications and variations are possible in light of the above teaching. The embodiment was chosen and described in order to best explain the principles of the invention and its practical application to thereby enable others in the art to best utilize the invention in various embodiments and with various modifications as are suited to the particular use contemplated. It is intended that the scope of the invention be defined by the claims appended hereto.

I claim:

1. An improved flasher unit for a turn signal system of a vehicle, said system having a flasher unit receptacle with two terminals, one terminal being connected to one side of the battery for said vehicle and the other terminal being connectable through a turn signal switch and signal lamp to the other side of said battery when and for as long as said turn signal switch is closed, said flasher unit being electrically connected solely to said two terminals, the improvement in said flasher unit comprising:
   a) switching means for electrically connecting said terminals directly together,
   b) means for cyclically operating said switching means for as long as said turn signal switch is closed, with said switching means being operated to connect said terminals together for a predetermined portion of each cycle of operation and to disconnect said terminals from each other for the rest of each cycle,
   c) means for generating an audible signal during each cycle of operation of said switching means, and
   d) means for progressively increasing the volume level of said audible signal during the time that said turn signal switch remains closed.

2. An improved flasher unit for a turn signal system of a vehicle, said system having a flasher unit receptacle with two terminals, one terminal being connected to one side of the battery of said vehicle and the other terminal being connectable through a turn signal switch and a signal lamp to the other side of said battery when and for as long as said turn signal switch is closed, said flasher unit being electrically connected solely to said two terminals, the improvement in said flasher unit comprising:
   a) switching means for electrically connecting said terminals directly together,
   b) a diode and a capacitor connected in series across said terminals,
   c) signal generating means for generating an audible signal of a volume level proportional to the amount of voltage across said signal generating means,
   d) a control circuit connected across said capacitor and powered by the voltage across said capacitor when said capacitor is charged, said control circuit including,
      i) means for cyclically operating said switching means for as long as said turn signal switch is closed, with said switching means being operated to connect said terminals together for a predetermined portion of each cycle of operation and to disconnect said terminals from each other during the rest of each cycle,
      ii) means for connecting said signal generating means across said capacitor during each cycle of operation of said switching means, and,
      iii) means for progressively increasing the voltage across said signal generating means during the time that said turn signal switch is closed.

3. An improved flasher unit as set forth in claim 2, wherein said means for connecting said signal generating means across said capacitor has the further function of repeatedly connecting and disconnecting said signal generating means to and from said capacitor at an audio frequency rate.

4. An improved flasher unit as set forth in claim 2, wherein said signal generating means is a speaker having a speaker coil and wherein said means for progressively increasing the voltage across said signal generating means has the further function of progressively connecting said speaker coil to said capacitor through progressively decreasing amounts of resistance.

5. An improved flasher unit as set forth in claim 4, wherein said means for connecting said signal generating means across said capacitor has the further function of repeatedly connecting and disconnecting said signal generating means to and from said capacitor at an audio frequency rate.

6. An improved flasher unit for a turn signal system of a vehicle, said system having a flasher unit receptacle with two terminals, one terminal being connected to one side of the battery of said vehicle and the other terminal being connectable through a turn signal switch and a signal lamp to the other side of said battery when and for as long as said turn signal switch is closed, said flasher unit being electrically connected solely to said two terminals, the improvement in said flasher unit comprising:
   a) switching means for electrically connecting said terminals directly together,
   b) a diode and capacitor connected in series across said terminals,
   c) signal generating means for generating an audible signal of a volume level proportional to the amount of voltage across said signal generating means,
   d) a control circuit connected across said capacitor and powered by the voltage across said capacitor when said capacitor is charged, said control circuit including,
      i) means for generating clock pulses of a predetermined frequency,
      ii) counter means for counting the number of said clock pulses,
      iii) means for cyclically operating said switching means, with said switching means being operated to connect said terminals together for a predetermined number of clock pulses counted by said counter means during each cycle of operation of said switching means and with said switching means being operated to disconnect said terminals from each other for a predetermined number of clock pulses counted by said counter means during the rest of each cycle,
      iv) means for connecting said signal generating means across said capacitor during each cycle of operation, and,
      v) means for progressively increasing the voltage across said signal generating means after successive predetermined numbers of clock pulses have been counted by said counter means.

7. An improved flasher unit as set forth in claim 6 wherein said means for connecting said signal generating means across said capacitor has the further function of repeatedly connecting and disconnecting said signal generating means to and from said capacitor at an audio frequency rate proportional to the frequency of said clock pulses.

8. An improved flasher unit as set forth in claim 6, wherein said signal generating means is a speaker having a speaker coil and wherein said means for progressively increasing the voltage across said signal generating means has the further function of progressively connecting said speaker coil to said capacitor through progressively decreasing amounts of resistance.

9. An improved flasher unit as set forth in claim 8, wherein said means for connecting said signal generating means across said capacitor has the further function of repeatedly connecting and disconnecting said signal generating means to and from said capacitor at an audio frequency rate proportional to the frequency of said clock pulses.

* * * * *